(12) United States Patent
Volpe et al.

(10) Patent No.: US 6,288,633 B1
(45) Date of Patent: Sep. 11, 2001

(54) ACTUABLE AUDIBLE DISPLAY FOR BICYCLE HANDLEBARS

(75) Inventors: Lee Volpe, Mt Laurel, NJ (US); Steven Goldmeier, Plainview, NY (US)

(73) Assignee: Rand International, Inc., Farmingdale, NY (US)

( * ) Notice: Subject to any disclaimer, the term of this patent is extended or adjusted under 35 U.S.C. 154(b) by 0 days.

(21) Appl. No.: 09/384,991

(22) Filed: Aug. 30, 1999

Related U.S. Application Data

(60) Provisional application No. 60/099,174, filed on Sep. 4, 1998.

(51) Int. Cl.⁷ .................................................. G08B 3/00
(52) U.S. Cl. ................................... 340/384.1; 340/384.3; 340/384.7; 340/384.73; 280/1.14
(58) Field of Search ............................. 340/384.1, 384.3, 340/384.7, 384.73, 384.4; 280/828, 1.13, 1.14, 1.16, 1.165, 1.22, 200

(56) References Cited

U.S. PATENT DOCUMENTS

| | | |
|---|---|---|
| 1,372,351 | 3/1921 | Hurlstone-Jones . |
| 2,578,682 | 12/1951 | Fernstrom . |
| 3,266,455 | 8/1966 | Cohn . |
| 3,621,606 | 11/1971 | Potrzuski . |
| 4,521,205 | 6/1985 | Spector ................................. 446/302 |
| 4,531,751 * | 7/1985 | Todokoro ............................ 280/1.13 |
| 4,563,373 | 1/1986 | Barnett ................................. 428/16 |
| 4,601,478 | 7/1986 | Robertson et al. .................. 280/1.13 |
| 4,646,350 | 2/1987 | Batra ....................................... 381/51 |
| 4,710,145 | 12/1987 | Hall Vandis .......................... 446/100 |
| 4,744,573 | 5/1988 | Most .................................... 280/1.13 |
| 4,890,571 | 1/1990 | Gaskill ................................ 116/22 A |
| 5,001,853 | 3/1991 | Odien ..................................... 40/312 |
| 5,022,666 * | 6/1991 | Simon ................................. 280/1.16 |
| 5,125,712 * | 6/1992 | Stamoustsos ....................... 296/77.1 |
| 5,463,369 * | 10/1995 | Lamping ............................ 340/384.7 |
| 5,549,313 * | 8/1996 | James et al. .......................... 280/221 |
| 5,710,422 * | 1/1998 | Clark .................................. 340/384.1 |
| 5,883,570 * | 3/1999 | Lusareta et al. ................... 340/384.7 |

* cited by examiner

Primary Examiner—Daniel J. Wu
Assistant Examiner—Toan Pham

(57) ABSTRACT

An actuable audible display (10) for mounting on the handlebars (12) of a child's vehicle such as a bicycle includes a visual image (15) depicted on a plate-like member (16) affixed to the handlebars and an actuable sound unit (19) mounted on the back of the plate-like member, which can be actuated by the rider of the bicycle to produce audible sounds that are commonly associated with what is depicted in the visual image. The plate-like member (16) has a generally trapezoidal shape corresponding to the shape of the handlebars, and is securable to the handlebars by looping self-locking ties (38) through holes (28, 30, 32, 34) in the plate-like member. The sound unit (19) is actuated by a button (54) which causes an electronics package (54) to retrieve from storage a recorded sound and to drive a loudspeaker 58 to produce a corresponding audible sound effect.

11 Claims, 4 Drawing Sheets

ACTUABLE AUDIBLE DISPLAY FOR BICYCLE HANDLEBARS

CROSS REFERENCE TO RELATED APPLICATION

This application claims priority from U.S. Provisional Patent Application Serial No. 60/099,174, entitled "Talking Bicycle Logo Plate," filed Sep. 4, 1998. The disclosure of that provisional patent application is incorporated herein by reference in its entirety.

BACKGROUND OF THE INVENTION

1. Field of the Invention

The present invention relates to a display for mounting on the handlebars of a child's vehicle such as a bicycle and, more particularly, to a display depicting a visual image and producing audio effects corresponding to the visual image.

2. Description of the Related Art

Children's vehicles such as bicycles and tricycles often include amusement and ornamental features and accessories designed to enhance the child's enjoyment of the vehicle. For example, colorful decals and name plates are frequently mounted on bicycles and tricycles, and horns, bells, lights and mirrors are commonly attached to the handlebars or the like for creating a variety of effects while the child is riding the vehicle.

A number of more exotic bicycle accessories have also been proposed. For example, U.S. Pat. No. 2,578,682 to Fernstrom, the disclosure of which is incorporated herein by reference in its entirety, discloses a simulated horse's head which mounts on the handlebars of a child's vehicle. Extending from the lower end of the device is a roller that engages the front wheel of the vehicle and rotates eccentrically as the front wheel rotates. Rotation of the roller causes the horse's head to bob up and down and produces a hoofbeat sound.

U.S. Pat. No. 4,601,478 to Robertson, the disclosure of which is incorporated herein by reference in its entirety, discloses a handlebar-mounted simulated flying-figure unit having flappable wings. The wings are actuated by a lever accessible to a child sitting behind the handlebars. Specifically, the lever has a button-shaped portion that is pressed to make the wings flap.

U.S. Pat. No. 4,744,573 to Most, the disclosure of which is incorporated herein by reference in its entirety, discloses a simulated steer head that mounts on handlebars. U.S. Pat. No. 3,266,455 to Cohn, the disclosure of which is incorporated herein by reference in its entirety, discloses a bicycle-mounted noise maker which produces noise in response to rotation of a wheel of the bicycle.

While bicycle accessories that produce visual and/or aural effects are well known, there are no known accessories that include a visual display of a recognizable image together with an integrated electronic sound unit which can be actuated to produce an audible sound effect that corresponds to the visual image.

SUMMARY OF THE INVENTION

It is an object of the present invention to enhance a child's enjoyment of riding a wheeled vehicle such as a bicycle with visual and aural effects.

It is a further object of the present invention to display a visual image on a bicycle in conjunction with sound effects that can be actuated by the rider of the bicycle.

It is yet a further object of the present invention to combine in a handlebar mounted display a visual image and actuable sound effects that are commonly associated with what is depicted in the visual image.

It is another object of the present invention to configure a sound producing unit of a handlebar-mounted display to be easily accessed and actuated by the rider.

It is yet another object of the present invention to prevent the ingress of moisture into a sound producing unit of a handlebar-mounted display.

It is still another object of the present invention to incorporate on a manual wheeled vehicle, decorated in accordance with a theme, an actuable audible display providing a visual image and sound effects corresponding to the theme.

A further object of the present invention is to configure a handlebar-mounted display to generally conform to the shape of the handlebars.

The aforesaid objects are achieved individually and in combination, and it is not intended that the present invention be construed as requiring two or more of the objects to be combined unless expressly required by the claims attached hereto.

According to the present invention, an actuable audible display for mounting on the handlebars of a child's vehicle such as a bicycle includes a visual image depicted on a plate-like member affixed to the handlebars and an actuable sound unit mounted on the back of the plate-like member, which can be actuated by the rider of the bicycle to produce audible sounds that are commonly associated with what is depicted in the visual image. The image and sounds of the display can be an integral part of an overall theme of the bicycle reflected in the paint, decals and accessories of the bicycle.

The plate-like member of the display has a generally trapezoidal shape corresponding to the shape of the handlebars, and provides a base on which the visual image and the sound unit are mounted. The visual image can include a two-dimensional drawing, picture or design, or a three-dimensional or relief structure affixed to or integral with the front surface of the plate-like member. The visual image can be virtually any item or character that can be commonly associated with a sound effect, a voice, a phrase, a song, etc. Plastic or wire ties can be threaded through sets of holes formed in the plate-like member and looped around the handlebars to secure the plate-like member to the handlebars.

The battery-powered sound unit is positioned on the back of the plate-like member to be easily reachable by the rider of the bicycle. To actuate the sound unit, the rider presses a button which causes an electronics package within the sound unit to retrieve from storage a recorded sound. The electronic package then generates an audio signal which drives a loudspeaker within the sound unit to produce a corresponding audible sound effect. The sound unit is designed to prevent moisture from entering in order to protect the internal components from malfunctioning.

The above and still further objects, features and advantages of the present invention will become apparent upon consideration of the following detailed description of specific embodiments thereof, particularly when taken in conjunction with the accompanying drawings wherein like reference numerals in the various figures are utilized to designate like components.

DETAILED DESCRIPTION OF THE PREFERRED EMBODIMENTS

Figure 1:
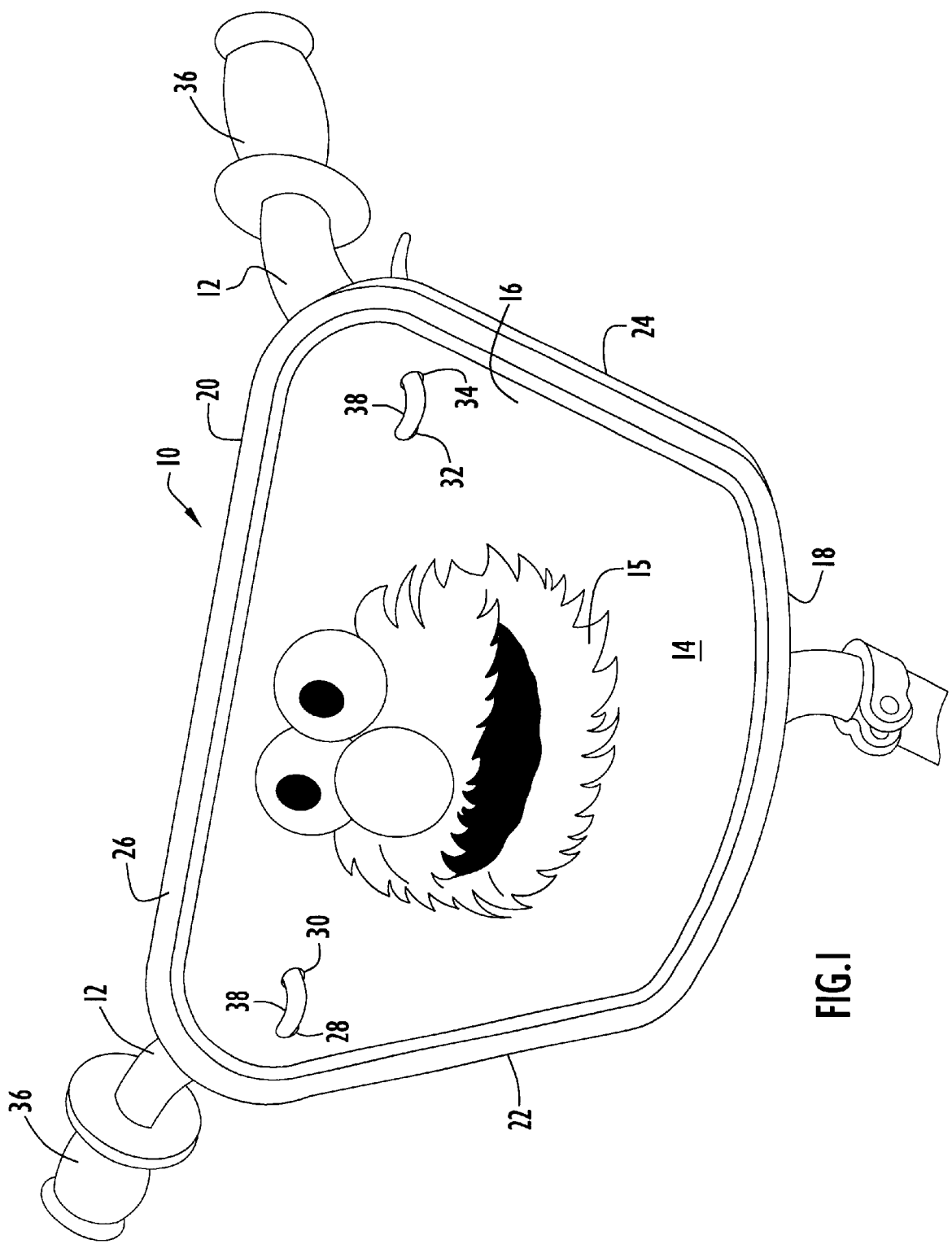
FIG. 1 is a perspective view of a handlebar-mounted actuable audible display according to an exemplary embodiment of the present invention.

As shown in perspective in FIG. 1, in accordance with an exemplary embodiment of the present invention, a display 10 that is mountable on the handlebars 12 of a bicycle includes a visual image and the capability to produce audio effects corresponding to the visual image. For convenience, the handlebars on which the display of the present invention is mounted will generally be referred to herein in the context of a bicycle. However, it will be understood that the display of the present invention can be mounted on the steering mechanism (or other location accessible to the rider) of any wheeled, manually operated vehicle including, but not limited to, children's bicycles, tricycles, and wheeled vehicles which require pedaling or engagement of feet with the ground to move.

The exemplary display 10 includes a plate-like member 16 having a generally trapezoidal shape with rounded corners. As used herein, the term "generally trapezoidal" refers to a shape that at least roughly corresponds to that of a trapezoid; a quadrilateral with two substantially parallel sides and two non-parallel sides extending therebetween. The term "generally trapezoidal" encompasses shapes that are not strictly trapezoidal, including shapes with rounded corners and sides that are somewhat curved.

Figure 2:
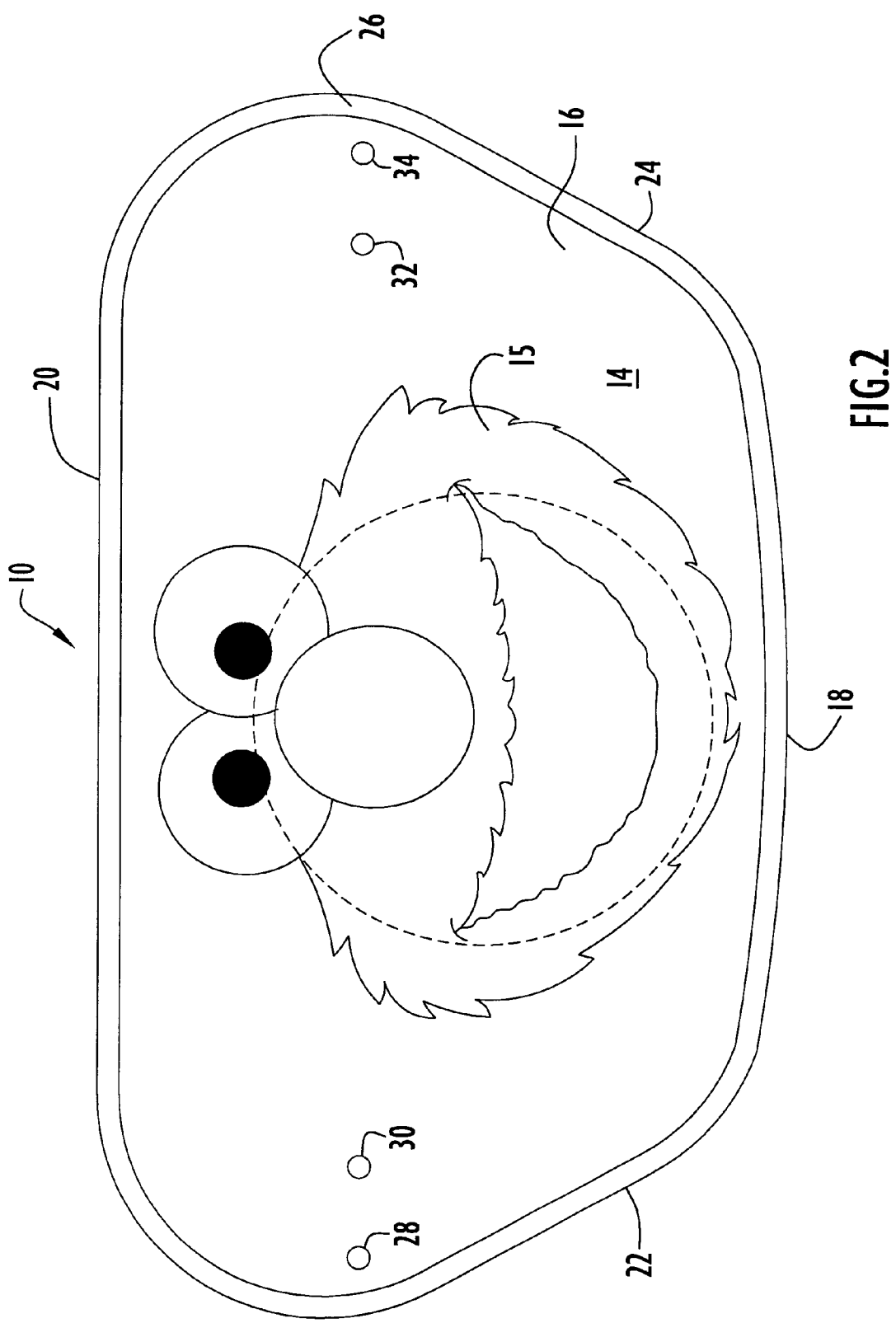
FIG. 2 is front view in elevation of the exemplary display shown in FIG. 1.
Figure 4:
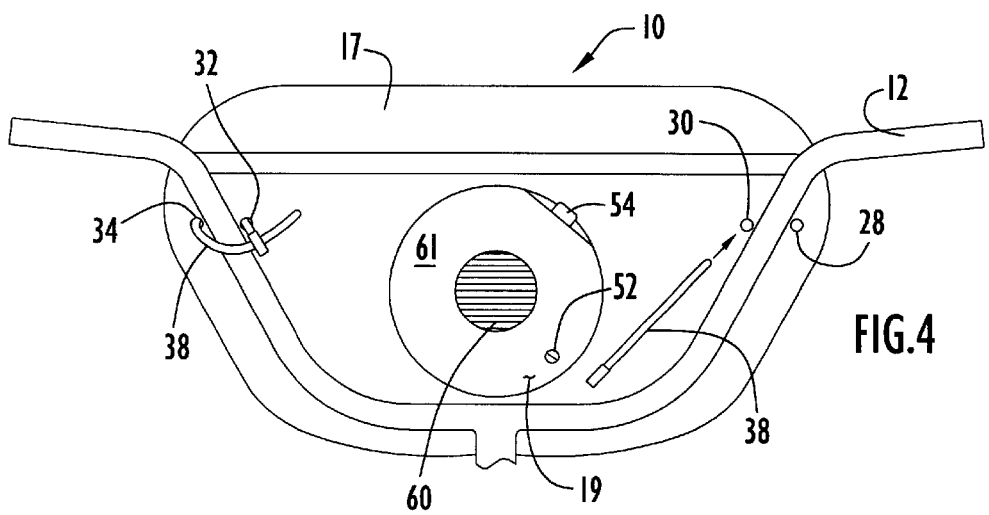
FIG. 4 is back view in elevation of the exemplary display shown in FIG. 1 mounted on the handlebars of a bicycle.

Referring to FIG. 2, when oriented in the normal mounting position on the handlebars (FIG. 1), the generally trapezoidal shaped plate-like member 16 includes a slightly-rounded, short bottom edge 18 lying substantially parallel to a longer top edge 20, with left and right side or lateral edges 22 and 24 slanting obliquely from bottom edge 18 to top edge 20, such that plate-like member 16 widens from the bottom to the top. Plate-like member 16 has a front surface 14 on which a visual display or image 15 is formed, and a back surface 17 on which is mounted a sound unit 19 (FIG. 4). Front surface 14 faces outward toward the front of the bicycle (i.e., visible to a person standing in front of the bicycle), while back surface 17 faces toward the back of the bicycle and is visible to the rider. A raised, rounded rim 26 on front surface 14 extends around the entire edge of plate-like member 16 providing a smooth edge and structural support and rigidity. Plate-like member 16 of the exemplary embodiment is shaped and sized to fit on the front handlebars of a bicycle (or tricycle) of a preschool or school-age child. To fit the handlebars of most child-sized bicycles, plate-like member 16 preferably extends approximately 10inches in the horizontal direction and 6 inches in the vertical direction when mounted on the handlebars. It is to be understood that these dimensions are provided by way of example only and are not in any way limiting on the scope of the invention. The plate-like member 16 can be formed of a polymer, such as polyethylene, using molding techniques, such as injection molding.

As seen in FIGS. 1–5, four holes are formed through plate-like member 16 to facilitate attachment of plate-like member 16 to the bicycle handlebars 12 in a fixed, stationary position. Specifically, two horizontally spaced-apart holes 28 and 30 are formed near the left edge toward the top of plate-like member 16, and two holes 32 and 34 are similarly formed near the right edge 24 toward the top of plate-like member 16, such that all four holes lie substantially along a horizontal line crossing through the upper half of member 16. The locations of the two sets of holes are such that the holes are approximately aligned with the handlebars when top edge 20 of plate-like member 16 is vertically aligned (i.e., at the same height) with the handlebar grips 36 (FIG. 1). Plate-like member 16 is secured to the handlebars 12 by means of wire or plastic ties 38. For example, each tie 38 can have a locking mechanism at one end, wherein the other end of the tie is inserted in the locking mechanism to form a loop that can be tightened to a desired size. Two ties 38 are respectively threaded through the two sets of holes in plate-like member 16 and around adjacent portions of the handlebar, forming snug-fitting loops which secure plate-like member 16 to handlebars 12 in two places (see FIGS. 1 and 4).

While ties can be used to secure the plate-like member to the handlebars, it will be understood that the invention is not limited to this particular attachment mechanism, and other techniques can be used to secure the plate-like member to the handlebars in a substantially stationary manner. For example, the plate-like member can have integrally-formed curved projections which fit snuggly around the handlebars, or hooks which permit the plate-like member to hang from a cross-member of the handlebars.

The generally trapezoidal shape of the plate-like member 16 of the exemplary embodiment is particularly advantageous, because the slanted lateral edges 22 and 24 of the plate-like member 16 generally follow the slanting direction of the handlebars (see FIG. 4), such that the display does not protrude from the sides of the handlebars in an awkward manner or interfere with handling of the bicycle, and produces an aesthetically pleasing effect. However, the present invention is not limited to displays having generally trapezoidal shapes, and any display with the features of the present invention having a display member suitable for mounting on handlebars is considered to be within the scope of the invention.

Referring again to FIGS. 1 and 2, a visual image 15 is formed on or mounted on front surface 14 of plate-like member 16. The visual image can be a three-dimensional or relief structure that projects from member 16 and/or a flat, two-dimensional image such as a picture, drawing or graphical design. In the exemplary embodiment, the image 15 is a three-dimensional representation of the face of a well-known children's television character that protrudes from the center of front surface 14. The protrusion of the character face from plate-like member 16 is best seen in FIG. 3.

Image 15 can also be formed on paper or the like adhesively attached to front surface 14. The image can include any variety of materials and effects, including: holographic images, light reflective material; phosphorescent (i.e., glow-in-the-dark) material or battery-powered lights. Image 15 can depict virtually any identifiable visual item that can be readily associated with a voice or sound effect including, but not limited to: any cartoon, toy, comic book, television, video/computer game or movie character; logos; animals; natural phenomena (e.g., lightning); and man-made devices (e.g., motorcycles, automobiles, watercraft and aircraft).

Figure 3:
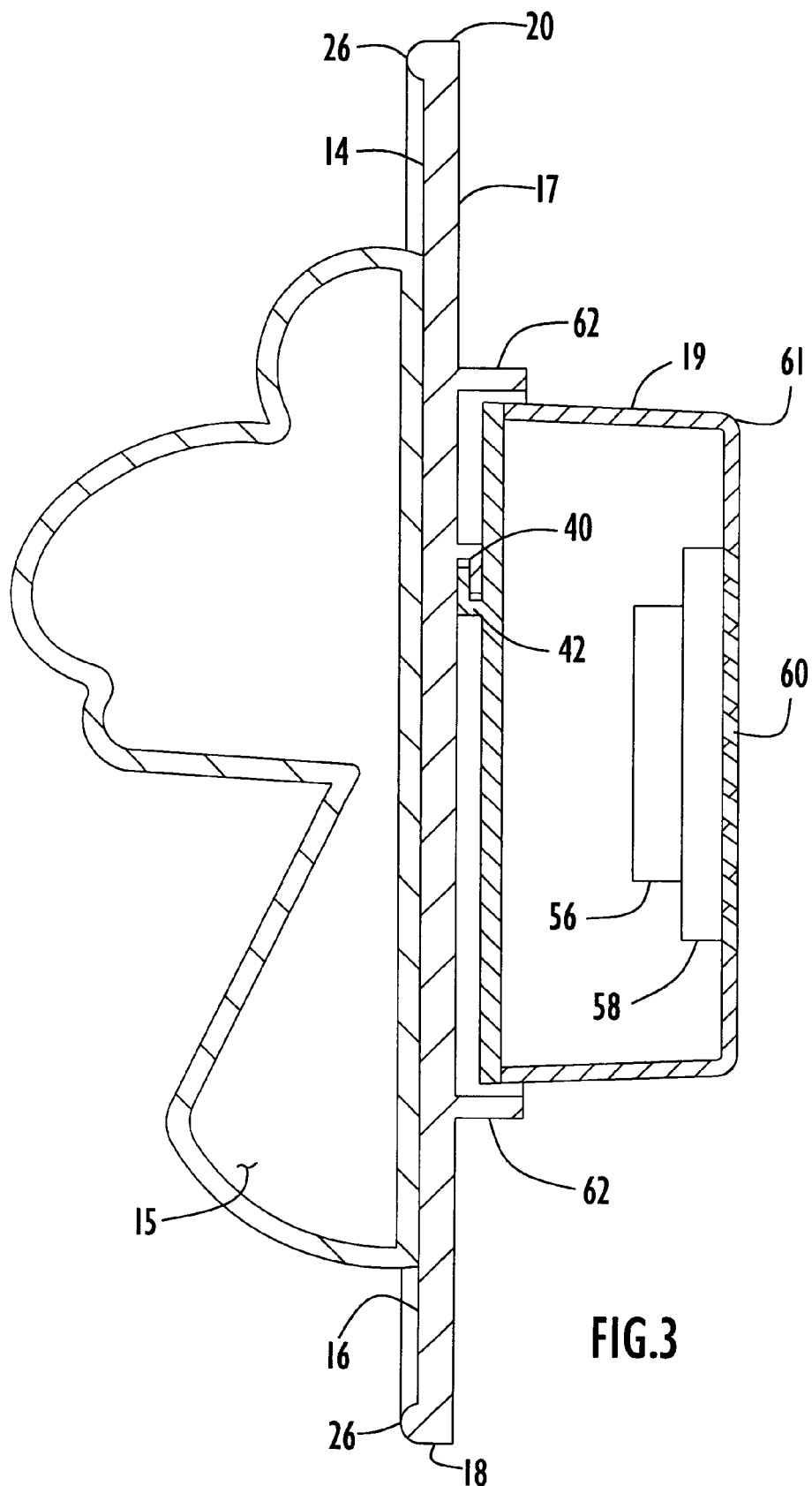
FIG. 3 is a side view in cross-section of the exemplary display shown in FIG. 1.
Figure 5:
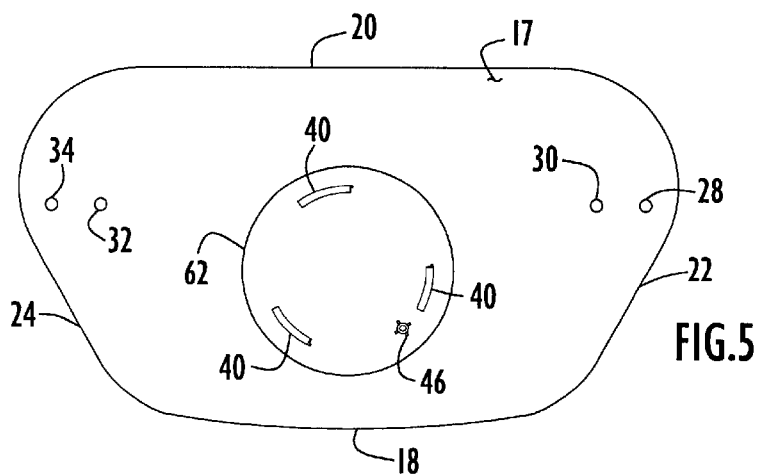
FIG. 5 is a back view in elevation of the exemplary display with the electronic sound unit removed.
Figures 6A, 6B:
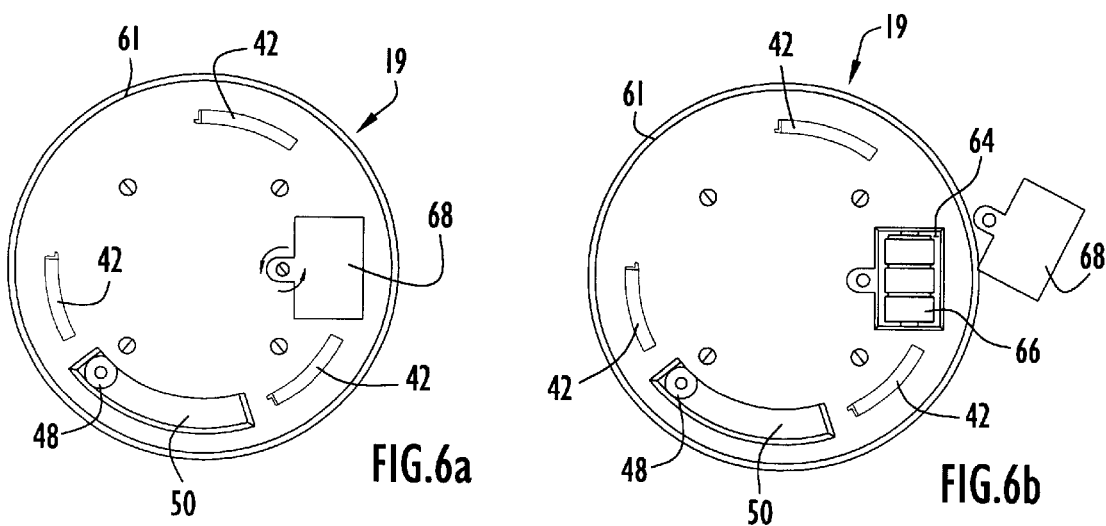
FIG. 6a is a front view in elevation of the electronic sound unit of the present invention.
FIG. 6b is a front view in elevation of the electronic sound unit with the battery cover removed.

As shown in FIGS. 3 and 4, a battery-powered electronic sound unit 19 is mounted at the center of the back surface 17 of the plate-like member 16, such that the sound unit is easily accessible to the rider of the bicycle. Referring to FIGS. 5, 6a and 6b, sound unit 19 is secured to plate-like member 16 by three, equally-spaced arcuate protrusions 40 on the same radius, which slidably engage and interlock with three mating arcuate protrusions 42 formed on the corresponding face of sound unit 19. Each of the protrusions 40 comprises a first upstanding arcuate wall extending perpendicularly from back surface 17 and terminating in a second arcuate wall extending radially inward in a plane parallel to back surface 17. The second wall terminates in a third arcuate wall extending back toward back surface 17, perpendicular to the second wall. The third wall tapers in width along the length of the protrusion, such that a wedge-shaped opening is formed between the second wall and back surface 17.

Each of the sound unit protrusions 42 comprises a first upstanding arcuate wall terminating in a second arcuate wall extending radially outward, such that each protrusion has an L-shaped cross-section in the radial direction. When sound unit 19 is placed on back surface 17 at the proper angular position, clockwise rotation of sound unit 19 causes protrusions 40 and 42 to slidably engage each other, with the second wall of each protrusion 42 sliding into the wedge-shaped opening under the second wall of the corresponding protrusion 40, thereby interlocking protrusions 40 and 42 and securing sound unit 19 to back surface 17. The wedge-shaped openings of protrusions 40 prevent over rotation and cause sound unit to be secured at a desired angular orientation. When rotated to the fully interlocked position, a threaded hole 48 in sound unit 19 is aligned with a female socket 46 projecting from back surface 17 into a slot 50 of sound unit 19. A screw 52 threaded through hole 48 and extending into socket 46 locks sound unit 19 in place and prevents angular rotation of sound unit 19.

Sound unit 19 includes a substantially disk-shaped outer casing 61 having: an inner face from which projections 42 extend to engage back surface 17; an outer face that faces the rider of the bicycle; and a substantially cylindrical side surface. By way of example, casing 61 can be formed of molded plastic. Housed within casing 61 of sound unit 19 are an electronics package 56 (FIG. 3), a loudspeaker 58 and a power source in the form of one or more button batteries 66 (FIG. 6b). An actuator in the form of a button 54 is located on the side surface of casing 61 toward the top. Sound unit 19 is actuated by pressing button 54, thereby causing sound unit to "play" a recorded message or audible sound effects. As used herein, the terms "actuated", "actuation" and "actuable" refer to the fact that the sound unit is controlled by a dedicated action of the rider or other person. In other words, sound is not produced spontaneously or simply as a result of riding the bicycle; some action other than normal operation of the bicycle must be taken by the rider to cause the sound effects to be produced. In the exemplary embodiment, the sound unit of the display is actuated by the rider pressing button 54 with, for example, a finger.

Electronics package 56 includes a sound storage device for storing recorded sounds that correspond to or are commonly associated with the visual image depicted on front face 14. The recorded sounds can include one or more audio sequences, such as: voices, laughter, singing, music, messages, phrases, or natural or man-made sound effects having some correspondence to or association with the visual image. For example, if the visual image depicts a well-known children's television character, the recorded sounds can include one or more phrases spoken in the character's recognizable voice or well-known phrases associated with the character. If the image evokes a reference to automobiles or racing, the recorded sounds can include simulated or recorded automobile or engine noises. Similarly, if a particular animal is displayed, the recorded sounds can be sounds typically made by the animal. The record sounds can be a single sound sequence that is repeated each time the button is pressed, or a set of sound sequences that are played in rotation as the button is pressed repeatedly.

When button 54 is pressed, electronics package 56 is activated and retrieves the (or one of the) recorded sounds from the sound storage device and generates an audio signal that is supplied to loudspeaker 58, causing loudspeaker 58 to project audible sounds corresponding to the recorded sounds, which can then be heard in the vicinity of the bicycle. Loudspeaker 58 is abutted against a circular grill 60 formed in the center of the outer face of casing 61 for facilitating passage of sound from the loudspeaker through casing 61.

As shown in FIGS. 6a and 6b, batteries 66 are contained in a battery storage compartment 64 accessible from the inner face of sound unit 19. Battery storage compartment 64 is enclosed by a cover plate 68 affixed with a screw to the inner face of sound unit 19. Battery storage compartment 64 can be accessed for changing the battery by removing screw 52 which secures sound unit 19 to back surface 17, rotating sound unit 19 counterclockwise to disengage projections 40 and 42, and removing the screw that secures cover plate 68.

Because the display of the present invention is designed to be mounted on a bicycle, it can be expected that the display will used outdoors and potentially be exposed to moisture from rain, sprinklers, puddles, etc. Accordingly, the display includes a number of features designed to prevent water from entering sound unit 19 and adversely affecting operation. In particular, a thin circular rim 62 having an inner diameter slightly greater than the outer diameter of sound unit 19 extends axially from back surface 17, such that rim 62 extends over the inner edge of the cylindrical side surface of casing 61 when sound unit 19 is secured to back surface 17 (see FIGS. 3 and 5). Further, in the thickness dimension of casing 61, the slats of grill 60 are angled downwardly from the inside to the outside of casing 61, such that moisture on grill 60 is channeled outward from casing 61. To prevent moisture that enters casing 61 around actuation button 54 from reaching electronics package 56 and loudspeaker 58, an internal enclosure is formed around the button mechanization to block moisture.

While the aforementioned configuration of the sound unit of the display of the present invention has been found to be particularly advantageous, it will be understood that the sound unit of the present invention can have any configuration and actuator that allow the rider of the bicycle to easily access and activate the sound unit to play recorded sounds. For example, the actuator need not be a button, and could be, for example, a lever, knob, key-like mechanism or any other mechanism responsive to an external action for triggering the sound unit to produce the audible sounds. Similarly, the overall shape of the sound unit, the mounting mechanism, the type and location of the batteries, and the electronics package can have any convenient configuration.

The display of the present invention can be included on a bicycle as part of an overall theme reflected in decorations on the bicycle. For example, the paint, decals and other accessories of the bicycle can depict colors, symbols or images that relate to a common theme found in the visual image and sound effects of the handlebar-mounted display, thus making the display an integral part of an overall theme presented by the bicycle. Using the same basic plate-like structure and sound unit configuration, a variety of different themes can be presented by affixing a particular visual image to the plate-like member and by storing particular corresponding sound effects in the sound unit. Thus, the same underlying display configuration can be used in the manufacture of a number of different types of theme bicycles targeted to the tastes and interests of different children.

Having described preferred embodiments of a new and improved actuable audible display for bicycle handlebars, it is believed that other modifications, variations and changes will be suggested to those skilled in the art in view of the teachings set forth herein. It is therefore to be understood that all such variations, modifications and changes are believed to fall within the scope of the present invention as defined by the appended claims.

What is claimed is:

1. An actuable audible display mountable on the handlebars of a wheeled manually operated vehicle, comprising:

a plate-like member securable to the handlebars and having a front surface and a back surface;

a visual image disposed on the front surface of said plate-like member; and an actuable sound unit coupled to the back surface of said plate-like member in a position accessible to a rider of the vehicle, said sound unit comprising an actuator located on the back surface of said plate-like member and being actuable from the back surface of said plate-like member, wherein, upon actuation of said sound unit via said actuator, said sound unit generates audible sounds that correspond to said visual image.

2. The display of claim 1, wherein said plate-like member has a generally trapezoidal shape.

3. The display of claim 1, wherein said plate-like member has holes formed therethrough and is affixed to the handlebars by ties threaded through the holes and around the handlebars.

4. The display of claim 1, wherein said plate-like member is affixed to said handlebars in a stationary manner.

5. The display of claim 1, wherein said visual image is a two-dimensional image.

6. The display of claim 1, wherein said visual image is a three-dimensional image projecting from said plate-like member.

7. The display of claim 1, wherein said visual image includes at least one of: a cartoon, toy, comic book, television, video/computer game or movie character; a logo; an animal; a natural phenomenon; and a man-made device.

8. The display of claim 1, wherein said sound unit further comprises:

an electronics package including a memory storing recorded sounds, said electronics package being responsive to said actuator for retrieving the recorded sounds and generating a corresponding audio signal;

a loudspeaker driven by said audio signal to produce the audible sounds; and a power source providing power to said actuator, said electronics package and said loudspeaker.

9. The display of claim 8, wherein said actuator is a button positioned within reach of the rider.

10. The display of claim 8, wherein said power source includes at least one battery.

11. The display of claim 1, wherein the audible sounds includes at least one of: a voice, laughter, singing, music, messages, phrases, and natural or man-made sound effects.

* * * * *